United States Patent [19]

Tytgat et al.

[11] 4,209,600

[45] Jun. 24, 1980

[54] PROCESS FOR POLYMERIZING, IN AQUEOUS SUSPENSION, HALOGEN-CONTAINING VINYL MONOMERS IN THE PRESENCE OF A CRUST FORMATION INHIBITOR

[75] Inventors: Daniel Tytgat, Brussels; Stephane Noël, Grimbergen; Lucien Clerbois, Vilvoorde, all of Belgium

[73] Assignee: Solvay & Cie., Brussels, Belgium

[21] Appl. No.: 856,736

[22] Filed: Dec. 1, 1977

[30] Foreign Application Priority Data

Dec. 1, 1976 [LU] Luxembourg ............................ 76309

[51] Int. Cl.$^2$ ............................................. C08F 14/06
[52] U.S. Cl. ..................................... 526/74; 526/225; 526/344
[58] Field of Search ....................... 526/74, 225, 344.2

[56] References Cited

U.S. PATENT DOCUMENTS

| | | | |
|---|---|---|---|
| 2,476,474 | 7/1949 | Baer | 526/344.2 |
| 3,004,009 | 10/1961 | Dell | 526/74 |
| 3,867,250 | 2/1975 | Jankowiak et al. | 526/225 |
| 3,900,455 | 8/1975 | Kraft et al. | 526/225 |
| 3,951,883 | 4/1976 | Ruchlak et al. | 526/344.2 |
| 3,957,744 | 5/1976 | Deuschel et al. | 526/74 |

*Primary Examiner*—Harry Wong, Jr.
*Attorney, Agent, or Firm*—Spencer & Kaye

[57] ABSTRACT

Process for polymerizing in a reactor containing a polymerization mixture, and in aqueous suspension, a halogen-containing vinyl monomer, using a lipo-soluble initiator which generates free radicals, in the presence of an effective amount of an inhibitor of crust formation derived from a sulfur-containing organic compound, wherein the inhibitor of crust formation consists of anions derived from at least one arylsulfonic acid.

15 Claims, No Drawings

PROCESS FOR POLYMERIZING, IN AQUEOUS SUSPENSION, HALOGEN-CONTAINING VINYL MONOMERS IN THE PRESENCE OF A CRUST FORMATION INHIBITOR

BACKGROUND OF THE INVENTION

The present invention relates to a process for the polymerization, in aqueous suspension, of halogen-containing vinyl monomers.

Polymerization in aqueous suspension is a polymerization technique which is currently used in the manufacture of polymers based on halogen-containing vinyl monomers. It comprises polymerizing the monomers in the form of droplets which are dispersed in water by means of mechanical stirring and in the presence of dispensing agents, using polymerization initiators which are liposoluble and generate for radicals. Polymerization in aqueous suspension is generally carried out in accordance with a discontinuous process in reactors, possessing a steel kettle, provided with a paddle stirrer and, optionally, baffles. Solid deposits of polymers, generally called "crusts", which adhere strongly to the internal surfaces of the reactors, (kettles, stirrers and baffles), are usually formed during the polymerization. This phenomenon is generally referred to by the name of crust formation.

Crust formation is extremely disadvantageous. In fact, the crusts covering the interior of the kettle reduce the amount of heat which it is possible to remove by means of the heat transfer fluid circulating in the double jacket with which the reactors are generally provided. As a result, the productivity is reduced because it is necessary to use lower speeds of polymerization than if there was no crust formation.

Furthermore, it frequently happens that during polymerization the crusts detach partially and contaminate the polymers obtained, which then contain infusible nodules originating from the crusts and commonly referred to as "fish-eyes".

Finally, crust formation, which always takes place irregularly, makes it more difficult to carry out, and control, the polymerization cycles.

Admittedly, it is customary to clean the internal surfaces of the reactors after each polymerization cycle. This cleaning is frequently carried out manually, but there are also more complex techniques which employ hot solvents or devices which spray jets of water at high velocity. However, this cleaning is always a laborious operation which is expensive in manual work, power and material, and which immobilizes the polymerization reactor for a long time.

It is for this reason that attempts have been made to prevent crust formation from taking place, by adding, to the polymerization mixture, various additives having an inhibiting effect on crust formation. Thus, in Belgian Pat. No. 837,056, filed on Dec. 24, 1975, in the name of SHINETSU CHEM CO, it is proposed to treat the walls of the reactors, which are intended to be used for the polymerization of vinyl chloride, with (a) at least one polar organic compound such as, for example, a sulfur-containing organic compound, such as a compound containing thiocarbonyl, thioether or thioalcohol groupings, a polysulfone or a sulfonic acid, and (b) at least one compound chosen from among the halides, hydroxides, oxides and carboxylates of the metallic elements belonging to periods 2 to 6 of groups IIB and III to VII of the periodic table, and the oxo-acids derived from the same elements. Furthermore, a solution or dispersion of the compounds (a) and/or (b) is added to the polymerization mixture in order to improve the effectiveness of the treatment. For the treatment of the walls to reduce the formation of crusts effectively, it is moreover essential to bring the compounds (a) and (b) into contact with each other at a temperature of at least 50° C. In order to do this, the solutions or dispersions of these compounds are heated prior to their application to the walls, or the said solutions or dispersions are applied in the cold and the coated walls are heated thereafter. In all cases, the prior treatment of the walls constitutes an operation which detracts from the productivity of the polymerization installations. In addition, the treatment is generally not totally effective.

SUMMARY OF THE INVENTION

There has now been found in accordance with the present invention, a simple and effective process for reducing crust formation in the reactors used for the polymerization, in aqueous suspension, of halogen-containing vinyl monomers. This process results from the selection of a class of polar organic compounds, and more particularly of a class of sulfur-containing organic compounds, which are totally effective without the necessity of applying them while hot to the walls of the polymerization reactors or of using them in combination with compounds derived from metals.

In accordance with its purpose, the present invention provides a process for the polymerization, in aqueous suspension, of halogen-containing vinyl monomers, using a lipo-soluble initiator which generates free radicals, in the presence of an effective amount of an inhibitor of crust formation derived from a sulfur-containing organic compound, in which process the inhibitor of crust formation consists of anions derived from arylsulfonic acids.

It is to be understood that both the foregoing general description and the following detailed description are exemplary, but are not restrictive of the invention.

DETAILED DESCRIPTION OF THE INVENTION

The anions used as inhibitors of crust formation in accordance with the present invention can be derived from any sulfonic acid which contains, in its molecule, at least one sulfonic groups —SO$_3$H directly bonded to a carbon atom which forms part of a hydrocarbon aromatic nucleus. Arylsulfonic acid is therefore to be understood as denoting arylmonosulfonic acids as well as aryldi- and arylpolysulfonic acids. Nevertheless, anions derived from arylmonosulfonic acids and from aryldisulfonic acids, and even more particularly those derived from arylmonosulfonic acids, are preferably used.

Furthermore, it does not matter whether the aryl radical of the arylsulfonic acids is derived from a monocyclic aromatic hydrocarbon, which may or may not be substituted, or from a polycyclic aromatic hydrocarbon, which may or may not be substituted and may or may not contain fused rings. In the case where the aryl radical is derived from a substituted aromatic hydrocarbon, the best results are obtained with substituents chosen, on the one hand, from among alkyl, cycloalkyl and thiol groupings and even more particularly alkyl groupings containing from 1 to 4 carbon atoms, and on the other hand, from among amino and anilino groupings, and even more particularly amino and aminoanilino groupings corresponding to the general formula

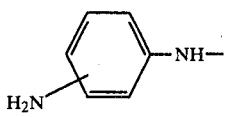

Examples of anions which can be used according to the present invention are those derived from benzenesulfonic, trichlorobenzenesulfonic, mono-, di and tri-aminobenzenesulfonic, anilinobenzenesulfonic, amino-anilinobenzenesulfonic, aminoanilinoaminobenzenesulfonic, toluenesulfonic, xylenesulfonic, mesitylenesulfonic, (tert.-butyl)-benzenesulfonic, bis(tert.-butyl)-benzenesulfonic, tris-(tert.-butyl)-benzenesulfonic, biphenylsulfonic, biphenyldisulfonic, naphthalenesulfonic and naphthalenedisulfonic acids.

The most efficient of all the anions which can be used according to the present invention are those derived, on the one hand, from arylsulfonic acids, the aryl radical of which is derived from an aromatic hydrocarbon, which may or may not be substituted, comprising at least two fused rings and, on the other hand, from arylsulfonic acids, the aryl radical of which is derived from a monocyclic aromatic hydrocarbon substituted by the groupings defined above.

Anions which are very particularly preferred are those which are derived, on the one hand, from naphthalenesulfonic acids, and more particularly from alpha-naphthalene sulfonic acid, and on the other hand, from xylenesulfonic acids, and more particularly from para-xylenesulfonic acid, and from aminoanilinoaminobenzenesulfonic acids, and more particularly from 2-(p-aminoanilino)-5-aminobenzenesulfonic acid. This acid corresponds to the general formula

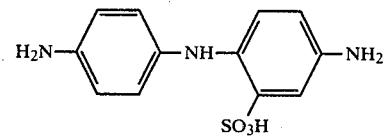

The anions can be employed in the process according to the present invention in the form of any compound which is water-soluble and which dissociates in water to form the anions defined aove. In particular, the anions can be generated from the corresponding arysulfonic acids and their salts. Among these, the alkaline earth metal salts and even more the alkali metal salts, for example the potassium and sodium salts, are preferred. The inhibitor of crust formation is advantageously used in the form of alkali metal salts of the corresponding arylsulfonic acids, and even more particularly in the form of sodium salts.

The process according to the present invention is applicable to the polymerization of halogen-containing vinyl monomers. The term halogen-containing vinyl monomers is intended to denote all the monomers, polymerizable by radical polymerization, which possess terminal olefinic unsaturation and are substituted by at least one halogen. Preferably, these monomers are chosen from among the substituted derivatives of ethylene and only contain two carbon atoms. By way of examples of such monomers there may be mentioned vinyl chloride, vinyl bromide, vinyl fluoride, vinylidene chloride, vinylidene fluoride, chlorotrifluoroethylene and tetrafluoroethylene. The invention is preferably applied to the polymerization of fluorine-containing and chlorine-containing vinyl monomers. It is particuarly suitable for polymerizing chlorine-containing vinyl monomers and very especially vinyl chloride.

The term polymerization is intended to denote both the homopolymerization of the halogen containing vinyl monomers and their copolymerization with one another or with other monomers copolymerizable with them. By way of examples of the latter, there may be mentioned the vinyl esters such as vinyl acetate, the acrylic esters such as methyl acrylate and glycidyl methacrylate, the unsaturated nitriles such as acrylonitrile and methacrylonitrile, the unsaturated diesters such as dibutyl maleate, the allyl esters such as allyl acetate, the unsaturated amides such as acrylamide, the derivatives of styrene and the α-olefines such as ethylene and propylene.

However, the present invention is preferably applied to the manufacture of polymers containing, in their molecule, at least 50 mol %, and more particularly at least 80 mol %, of units derived from halogen-containing vinyl monomers.

The present invention is applicable both to the manufacture of statistical copolymers and to the manufacture of block or graft copolymers.

Polymerization of the halogen-containing vinyl monomers is carried out in the presence of the customary ingredients for polymerization in aqueous suspension, namely in the presence of suspending agents or dispersing agents and of oil-soluble initiators which generate free radicals. Conventional dispersing agents are generrally used, such as finely dispersed solids, gelatines, water-soluble cellulosic ethers, synthetic polymers such as polyvinyl alcohols, polyvinylpyrrolidone and vinyl acetate-maleic anhydride copolymers, and their mixtures. It is also possible to employ surface-active agents at the same time as the dispersing agents. The amount of dispersing agent employed generaly varies between 0.5 and 1.5% by weight relative to the water.

Any lipo-soluble initiator can be used in the suspension polymerization according to the invention. By way of examples, there may be mentioned the peroxides such as di-tertiary butyl peroxide, lauroyl peroxide and acetyl-cyclohexylsulfonyl peroxide, the azo compounds such as azo-bis-isobutyronitrile and azo-bis-2, 4-dimethylvaleronitrile, and dialkyl peroxydicarbonates such as diethyl, diisopropyl, dicyclohexyl and di-tertiary butyl-cyclohexyl peroxydicarbonates, and the alkylboron compounds. In general, these initiators are employed at a rate of 0.01 to 1% by weight relative to the monomers.

In addition to the dispersing agents and initiators, the polymerization mixture can also contain various additives normally employed in the conventional technique for polymerization in aqueous suspension. By way of examples of such additives there may be mentioned buffers, agents for regulating the diameter of the polymer particles, molecular weight regulators, stabilizers, plasticizers and dyestuffs as well as reinforcing agents or agents which facilitate the processing of the polymers.

The operating conditions for the polymerization process according to the present invention do not differ from those usually employed. Thus, in the case of the polymerization of vinyl chloride, the temperature is in general between 35° and 80° C. The absolute pressure is in general less than 15 kg/cm². The pH is in general acid, for example between 2 and 7. The amount of water employed is in general such that the total weight of the monomers represents 20 to 50% of the total weight of the water and the monomers.

In general, the polymerization of the halogen-containing vinyl monomers is carried out discontinuously in cycles in which water is first introduced, followed by the various components of the reaction mixture (dispersing agents, initiators, monomers, and the like). According to a preferred embodiment of the present invention, the inhibitor of crust formation is introduced into the polymerization mixture before any halogen-containing vinyl monomer, the best results being obtained if it is introduced also before any initiators. To do this, it suffices to add the inhibitor of crust formation after the water has been introduced optionally at the same time as the dispersing agents.

It is also possible to introduce the inhibitor of crust formation into the polymerization mixture in several stages during the polymerization, or to introduce it continuously during the polymerization.

To cause the polymerization to start, the polymerization mixture is heated, for example, by means of the heat transfer fluid circulating inside the double jacket with which the reactors are usually provided. Preferably, the inhibitor of crust formation is introduced into the polymerization mixture before starting the heating.

If the polymerization is carried out continuously, the inhibitor of crust formation is preferably also introduced continuously into the polymerization mixture.

The amounts of inhibitor of crust formation to be employed can vary very widely especially depending on the nature of the monomers and the condition of the internal surfaces of the reactors used. In general, an amount of inhibitor of crust formation such that the polymerization mixture contains by weight at least 0.1 ppm thereof, relative to the water, is used. Preferably, the polymerization mixture contains at least 1 ppm of inhibitor relative to the water. The best results are obtained if the polymerization mixture contains at least 5 ppm of inhibitor of crust formation, relative to the water.

There is no disadvantage in using large amounts of the inhibitor of crust formation. However, it is in general pointless to exceed a content, in the polymerization mixture, of 10,000 ppm of inhibitor of crust formation, relative to the water. Most frequently, a content of at most 1,000 ppm suffices. In virtually all the cases, a content equal to at most 100 ppm is entirely satisfactory. Usually a content of at most 50 ppm is not exceeded.

According to a preferred embodiment of the present invention, from about 5 to 50 ppm, and even more particularly from about 5 to 25 ppm, of inhibitor of crust formation are used, relative to the water present in the polymerization mixture.

It has been observed that a certain amount of inhibitor of crust formation is adsorbed on the internal metallic surfaces of the polymerization reactors. For this reason, it is preferred that the polymerization mixture should contain an amount of inhibitor of crust formation at least equal to 1 mg per square meter of internal metallic surface area, and preferably at least 5 mg/m². Also for this reason, a certain amount of inhibitor of crust formation can remain adsorbed on the internal metallic surfaces of the reactors at the end of a polymerization cycle, and exert its effects during the next cycle. It is possible to take this quantity into account and reduce the amount added during the next cycle.

When starting to use the process according to the present invention in a particular reactor, it is of value first to clean the internal surfaces particularly carefully. To do this, it is possible to employ particularly efficient solvents for the polymers which form the crusts, to carry out a pyrolysis of the walls, or to carry out descaling or even repolishing.

The inhibitors of crust formation which form the subject of the present invention are remarkably effective, and their use does not demand any prior treatment of the internal walls of the reactors. Thus, they can be simply introduced into the polymerization mixture and do not have to be applied in a separate step to the walls of the reactor. They are already completely effective when about 7 ppm relative to the water are used. Furthermore, they include a very large number of compounds which do not exhibit any adverse secondary effect as regards the appearance of the polymer, its color, odor, its heat and light stability and its ability to be used in foodstuff packaging.

The polymers obtained according to the present invention can be used for all the customary applications of this type of product and especially for the manufacture of articles such as bottles or profiles in accordance with the conventional techniques of, for example, extrusion-blowing and extrusion.

The examples which follow are intended to illustrate the invention and in no way limit it.

EXAMPLES 1 to 5

Examples 1, 2, 3 and 4 are carried out according to the invention. Example 5 (R) is given by way of comparison.

A stainless steel laboratory reactor of 3 liters capacity, equipped with a double jacket in which a heat transfer fluid flows and with a conventional paddle stirrer made of stainless steel, is used. The internal surfaces of the reactor are cleaned by washing by means of tetrahydrofuran, followed by pyrolysis carried out by heating the wall to 400° C. for 30 minutes. The reactor is then descaled by means of a hydrofluoric acid/nitric acid bath, after which it is rinsed 5 times with demineralized water.

1,500 g of demineralized water and 10 mg of the sodium salt of a sulfonic acid (Examples 1, 2, 3 and 5 (R), or 10 mg of a sulfonic acid (Example 4), respectively, are introduced successively into the reactor. Thereafter, 1.65 g of polyvinyl alcohol are introduced. The stirrer is started. Thereafter, the reactor is twice subjected to a vacuum (of 100 mm of mercury, absolute pressure) and between the two operations the reactor is flushed with technical-grade nitrogen at an absolute pressure of 1,360 mm of mercury. 1,000 g of vinyl chloride and then 500 mg of diethyl peroxydicarbonate are introduced. The polymerization mixture is heated to 61° C. at the rate of 1° C. per minute.

The polymerization mixture is kept at 61° C. while stirring until the absolute pressure drops by 3.5 kg/cm². The polymerization is then stopped by letting down the pressure in the reactor and vaporizing the unpolymerized vinyl chloride. The mixture is cooled and the polymer is collected by filtration followed by drying.

Table I below specifies the nature of the inhibitor of crust formation used, as well as the result of the inspection of the internal surfaces of the reactor at the end of the polymerization cycle.

TABLE I

| Example No. | Inhibitor of crust formation | Result of the inspection |
|---|---|---|
| 1 | p-xylenesulfonate | No soiling of the walls |
| 2 | α-naphthalenesulfonate | No soiling of the walls |
| 3 | trichlorobenzene-sulfonate | Slight soiling; the walls are coated with a thin continuous film |
| 4 | 2-(p-aminoanilino)-5-aminobenzenesulfonic acid | No soiling of the walls |
| 5 | (R) dioctylsulfonsuccinate | Significant soiling; the walls are coated with a thick and sticky deposit |

These examples demonstrate the superiority of the anions derived from arylsulfonic acids, and more particularly that of the anions derived from p-xylenesulfonic, alpha-naphthalenesulfonic and 2-(p-aminoanilino)-5-aminobenzenesulfonic acids over sulfur-containing organic compounds, and even more particularly over non-aromatic sulfonic acids.

It will be understood that the above description of the present invention is susceptible to various modifications, changes and adaptations, and the same are intended to be comprehended within the meaning and range of equivalents of the appended claims.

What is claimed is:

1. Process for the manufacturing of polymers containing in their molecule at least 50 mol% of halogen-containing vinyl monomer units by polymerizing in a reactor containing a polymerization mixture, and in aqueous suspension, a halogen-containing vinyl monomer, using an oil soluble initiator which generates free radicals, in the presence of an effective amount of an inhibitor of crust formation wherein the inhibitor of crust formation consists of arylsulfonic acid anions selected from naphthalenesulfonic acid anions, xylenesulfonic acid anions and aminoanilinoaminobenzenesulfonic acid anions, said anions being present in a quantity of less than 50 ppm relative to the water.

2. Process according to claim 1, wherein the anions are para-xylenesulfonic acid anions.

3. Process according to claim 1, wherein the anions are 2-(p-aminoanilino)-5-aminobenzenesulfonic acid anions.

4. Process according to claim 1, wherein the anions are alpha-naphthalenesulfonic acid anions.

5. Process according to claim 1, wherein the anions are introduced into the polymerization mixture in the form of an alkali metal salt of the corresponding arylsulfonic acid.

6. Process according to claim 1, wherein the anions are introduced into the polymerization mixture in the form of the corresponding arylsulfonic acid.

7. Process according to claim 1, wherein the anions are introduced into the polymerization mixture before the halogen-containing vinyl monomer.

8. Process according to claim 1, wherein the anions are introduced into the polymerization mixture before the oil-soluble initiator which generates free radicals.

9. Process according to claim 1, wherein the anions are present in a quantity of at least 1 ppm relative to the water present in the polymerization mixture.

10. Process according to claim 9, wherein the anions are present in a quantity of at least 5 ppm relative to the water present in the polymerization mixture.

11. Process according to claim 1, wherein the anions are present in a quantity of at least 5 mg per square meter of internal metallic surface area of the reactor.

12. Process according to claim 1, wherein the anions are introduced into the polymerization mixture before the latter is heated to cause the polymerization reaction to start.

13. Process according to claim 1, wherein the halogen-containing vinyl monomer is selected from the group consisting of fluorine-containing monomers and chlorine containing monomers derived from ethylene.

14. Process according to claim 13, wherein the halogen-containing monomer is vinyl chloride.

15. Process for the manufacturing of polymers according to claim 1, wherein the polymers in their molecule contain at least 80 mol% of the halogen-containing vinyl monomer units.

* * * * *